(12) United States Patent
Tiedemann, Jr. et al.

(10) Patent No.: US 7,161,971 B2
(45) Date of Patent: Jan. 9, 2007

(54) SENDING TRANSMISSION FORMAT INFORMATION ON DEDICATED CHANNELS

(75) Inventors: Edward G. Tiedemann, Jr., Concord, MA (US); Yongbin Wei, San Diego, CA (US); Peter Gaal, San Diego, CA (US); Sai Yiu Duncan Ho, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 849 days.

(21) Appl. No.: 10/135,779

(22) Filed: Apr. 29, 2002

(65) Prior Publication Data

US 2003/0202560 A1 Oct. 30, 2003

(51) Int. Cl.
*H04B 1/69* (2006.01)
(52) U.S. Cl. .................................... 375/141
(58) Field of Classification Search ........ 375/140–141, 375/146–147; 370/209, 342, 345, 350, 322, 370/329
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 6,473,395 B1* | 10/2002 | Lee | 370/209 |
| 6,504,832 B1* | 1/2003 | Koo et al. | 370/342 |
| 6,961,304 B1* | 11/2005 | Rudrapatna et al. | 370/209 |
| 2002/0176384 A1* | 11/2002 | Chandra et al. | 370/335 |
| 2003/0103447 A1* | 6/2003 | Thorson et al. | 370/209 |

* cited by examiner

*Primary Examiner*—Khanh Tran
(74) *Attorney, Agent, or Firm*—Philip R. Wadsworth; Thien T Nguyen; Ramin Mobarhan

(57) ABSTRACT

Transmissions on the dedicated channel are encoded using a set of paramaters that are picked from a large selection of potential parameters. If the remote station does not know the particular set of parameters that were used by a base station, then the remote station would have to attempt to decode the transmission using every set of parameters, until the transmission is decoded correctly. This is an inefficient methodology. Hence, transmission format information is typically transmitted on a broadcast channel so that a remote station could receive the transmission format information. However, the broadcast channel has reliability problems. New methods and apparatus are presented to allow a base station to determine an overlapping set of Walsh code sequences that can be used to send the transmission format information on the dedicated channel, rather than a broadcast channel. Using the overlapping set allows the remote station to decode the information.

5 Claims, 6 Drawing Sheets

SENDING TRANSMISSION FORMAT INFORMATION ON DEDICATED CHANNELS

BACKGROUND

1. Field

The present invention relates generally to communications, and more specifically, to improving the reliable conveyance of orthogonal space information used to identify code channels in a spread spectrum communication system.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses systems operating on both cellular and personal communication services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ *Generation Partnership Project "3GPP"*, Document Nos. 3G TS 25.211, 3G TS 25.212, 3G TS 25.213, and 3G TS 25.214.

The telecommunication standards cited above are examples of only some of the various communication systems that can be implemented. Some of these various communication systems are configured so that remote stations can transmit information regarding the quality of the transmission medium to a serving base station. As described herein, a "serving" base station is a base station in communication with the remote station. This channel information can then be used by the serving base station to optimize the power levels, the transmission formats, and the timing of forward link transmissions, and further, to control the power levels of reverse link transmissions.

As used herein, "forward link" refers to all transmissions directed from a base station to a remote station and "reverse link" refers to all transmissions directed from a remote station to a base station. The forward link and the reverse link are uncorrelated, meaning that observations of one do not facilitate the prediction of the other. However, for stationary and slow-moving remote stations, the characteristics of the forward link transmission path will be observed to be similar to the characteristics of the reverse link transmission path in a statistical sense.

The forward link is a shared resource between remote stations. To ensure simultaneous transmissions to a plurality of remote stations, channelization using orthogonal codes can be implemented. The number of orthogonal codes is a limited system resource and must be allocated and re-allocated on a dynamic basis. The choice of which orthogonal code to use is part of the optimization process implemented by the base station.

Transmissions for a particular remote station are sent on a dedicated channel and transmissions for a group of remote stations are sent in a broadcast manner. The transmissions on the dedicated channel are encoded using a set of parameters that are picked from a large selection of potential parameters. If the remote station does not know the particular set of parameters that were used by a base station, then the remote station would have to attempt to demodulate and decode the transmission using every set of parameters, until the transmission is decoded correctly. This is an inefficient methodology. Hence, transmission format information is typically transmitted on a broadcast channel so that a remote station could receive the transmission format information. The remote stations are configured to use assigned transmission format information in order to decode the broadcast channel.

For example, if data is to be sent to a remote station, the base station would package the data according to a given transmission format, i.e., "packaging," and send both the packaged data and information about the type of packaging used to the remote station. Knowledge as to the type of packaging allows the remote station to open the packaged data quickly and efficiently. However, sending the packaging information can be problematic.

In order to improve the data throughput rates, transmission format information must be sent in a manner that is easily demodulated and decoded by the remote station. Typically, the transmission format information is sent as a broadcast, so that the remote station can demodulate and decode the information quickly, without set-up delays. However, there are flaws that are common and inevitable to all broadcast transmissions: reliability and efficiency. For a broadcast transmission, the base station cannot readily determine who may have received the broadcast and who may have missed the broadcast. Hence, if broadcasted transmission format information is missed, a remote station may also miss the corresponding transmission on the dedicated channel.

SUMMARY

Methods and apparatus are presented herein to address the problems stated above. In one aspect, a method is presented for formatting a message to be sent on a dedicated channel to a remote station, wherein the transmission format of the message is unknown by the remote station, comprising: comparing the new Walsh space of the message to a previous Walsh space of a previous message sent to the remote station; determining an overlapping set of Walsh code sequences from comparing the new Walsh space and the previous Walsh space; and sending the message on the dedicated channel using the overlapping set of Walsh code sequences.

In another aspect, a method is presented for ensuring that a remote station receives the transmission format information associated with a transmission on a dedicated channel, comprising: sending a broadcast message containing the transmission format information to the remote station; if a negative acknowledgment is received from the remote station, then: formatting the broadcast message using an overlapping set of Walsh code sequences; and transmitting the re-formatted broadcast message on the dedicated channel to the remote station.

DETAILED DESCRIPTION

Figure 1:
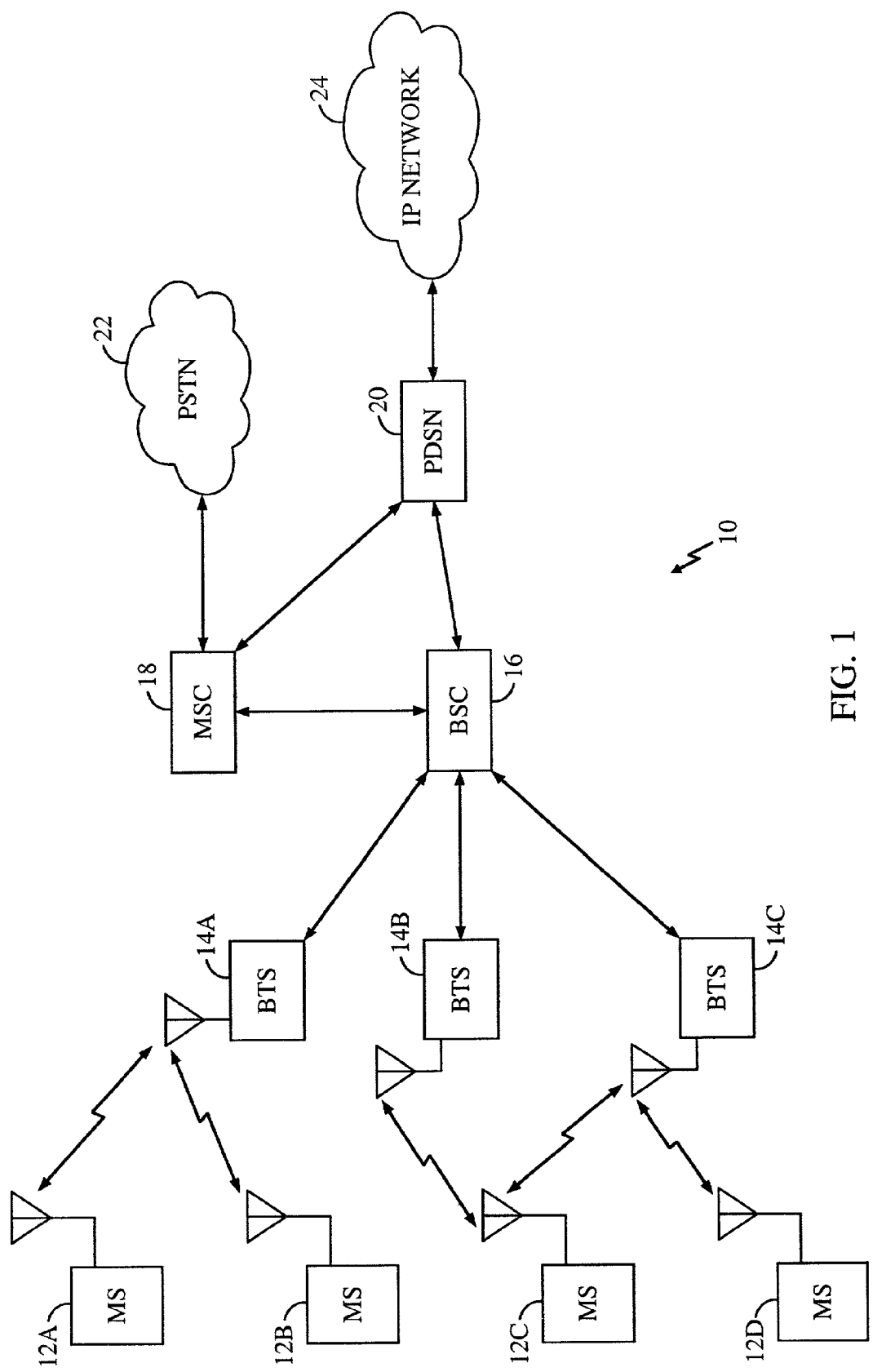
FIG. 1 is a diagram of a wireless communication network.

As illustrated in FIG. 1, a wireless communication network 10 may generally include a plurality of mobile stations (also called remote stations or subscriber units or user equipment) 12a–12d, a plurality of base stations (also called base station transceivers (BTSs) or Node B) 14a–14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a–12d, three base stations 14a–14c, one BSC 16, one MSC 18, and one PDSN 20 are shown. It would be understood by those skilled in the art that there could be more or less number of mobile stations 12, base stations 14, BSCs 16, MSCs 18, and PDSNs 20.

In one embodiment the wireless communication network 10 is a packet data services network. The mobile stations 12a–12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a–12d may be configured to perform one or more wireless packet data protocols such as described in, for example, the EIA/TIA/IS-707 standard. In a particular embodiment, the mobile stations 12a–12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a–14c, via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 can be coupled directly to the PDSN 20.

During typical operation of the wireless communication network 10, the base stations 14a–14c, receive and demodulate sets of reverse signals from various mobile stations 12a–12d engaged in telephone calls, Web browsing, or other data communications. Each reverse signal received by a given base station 14a–14c, is processed within that base station 14a–14c. Each base station 14a–14c, may communicate with a plurality of mobile stations 12a–12d by modulating and transmitting sets of forward signals to the mobile stations 12a–12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a–12d from one base station 14a–14c, to another base station 14a–14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used hereafter. Such use is not intended to limit the implementation of the embodiments herein to cdma2000 systems. Implementations in other systems, such as, e.g., WCDMA, can be accomplished without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels for a designated party, while packet data channels usually carry signals that are designated for different parties in a time and/or code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, an identification of the orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps.

Orthogonal and quasi-orthogonal codes, such as the Walsh code sequences, are used to channelize the information sent to each remote station. In other words, Walsh code sequences are used on the forward link to allow the system to overlay multiple users, each assigned one or several different orthogonal or quasi-orthogonal codes, on the same frequency during the same time duration. For example, Walsh code sequences are generated by a Walsh function, which can be defined recursively as follows:

$$W(n) = \begin{vmatrix} W(n/2) & W(n/2) \\ W(n/2) & W'(n/2) \end{vmatrix},$$

where W' denotes the logical complement of W, and W(1)=0. Thus, $$W(2) = \begin{vmatrix} 0 & 0 \\ 0 & 1 \end{vmatrix} \text{ and}$$

$$W(4) = \begin{vmatrix} 0 & 0 & 0 & 0 \\ 0 & 1 & 0 & 1 \\ 0 & 0 & 1 & 1 \\ 0 & 1 & 1 & 0 \end{vmatrix}.$$

W(8) is as follows:

$$W(8) = \begin{vmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{vmatrix}$$

A Walsh sequence is one of the rows of a Walsh function matrix. A Walsh function of order n contains n sequences, each of length n bits. Data transmission is covered by one or several such spreading codes, thereby allowing CDMA separation between different transmissions occurring at the same time and on the same frequency. In this context, "code space" or alternatively, "Walsh space" is a term that refers to the set of spreading code sequences that is used to transmit the data.

In order to recover the originally transmitted data bits of a data traffic channel, a decoder must be able to determine how many spreading codes are being used to cover the data, and which spreading codes are being used. Since a channel can use several possible spreading codes and a variety of optional coding and modulation formats, it is desirable for the decoder at a receiving end to be informed as to the actual transmission parameters used at the transmission end. The transmission parameters can be carried over one or several, separate control channels, which can be implemented to transmit occasionally or to transmit each time a data traffic transmission occurs. The receipt of the transmission parameters will allow the decoder to promptly begin decoding and demodulating the data traffic channel.

In a cdma2000 system, one type of data traffic channel is the Forward Packet Data Channel (F-PDCH). An F-PDCH is assigned to a single remote station for designated time duration. The generation of F-PDCHs by the base station consumes a varying amount of resources. For example, a new voice call originating in the serving area of a base station reduces the number of Walsh codes available for other remote stations, while a release of a voice call increases the number of available Walsh codes.

Figure 2:
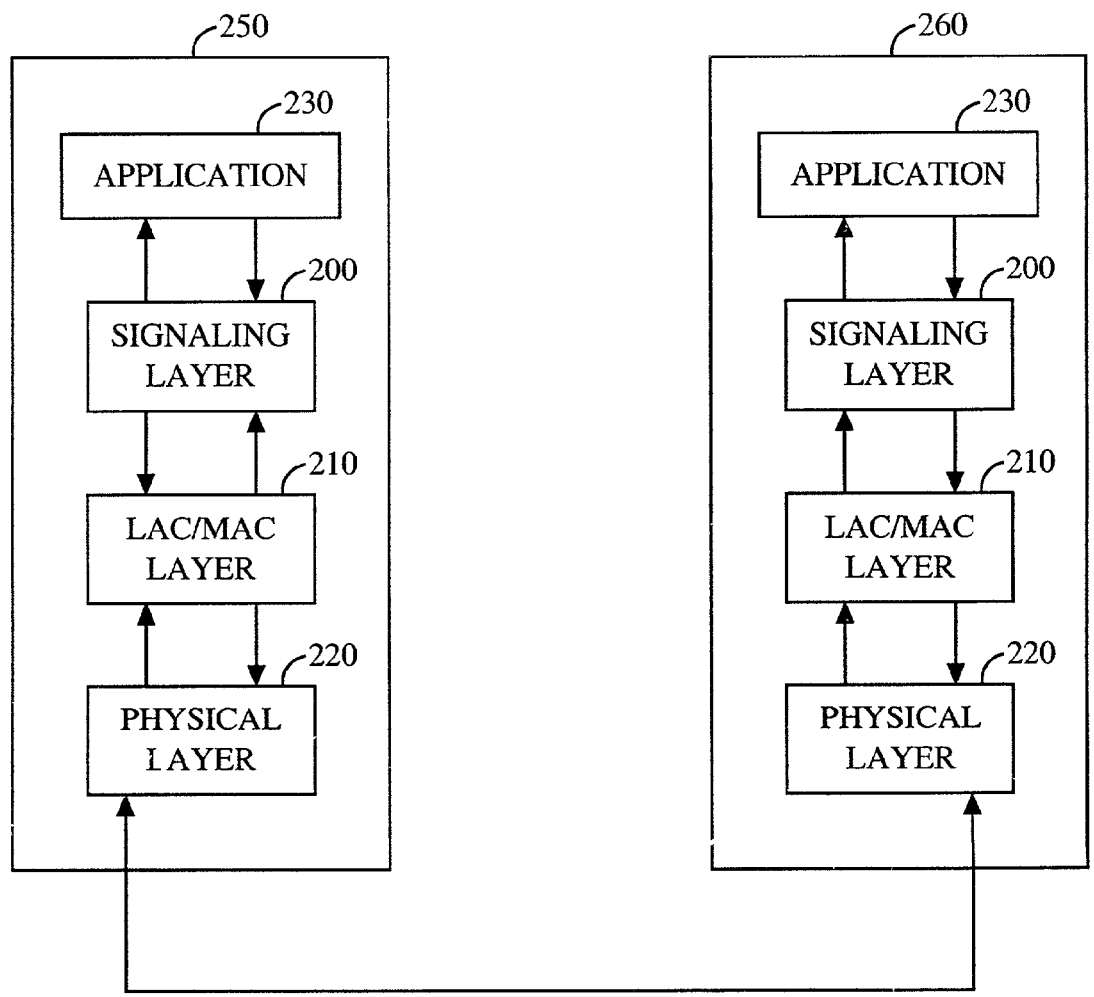
FIG. 2 is a diagram of the interaction between signaling layers L1, L2, L3 in a base station and in a remote station.

As is known in the art, layering is a method for organizing communication protocols in well-defined encapsulated data units between otherwise de-coupled processing entities, i.e., layers. FIG. 2 illustrates three protocol layers L1 220, L2 210, and L3 200 implemented in both a base station 250 and a remote station 260. Layer L1 220 provides for the transmission and reception of radio signals between the base station and remote station, layer L2 210 provides for the correct transmission and reception of signaling messages, and layer L3 200 provides for the control messaging for the communication system. Layer L3 200 originates and terminates signaling messages according to the semantics and timing of the communication protocol between the base station 250 and the remote station 260. In a cdma2000 system, L1 is referred to as the Physical Layer, L2 is referred to as the Link Access Control (LAC) Layer or the Medium Access Control (MAC) Layer, and L3 is referred to as the Signaling Layer. On top of Signaling Layer is the Application Layer 230, which contains functions for particular application services.

At layer L3 200, voice traffic 201, packet data traffic 203, and system services 205 are conveyed via data units constructed in accordance with the standards discussed previously. The transmission parameters, such as the Walsh space information, are processed at layer L3. For cdma2000 systems, the Walsh space information is communicated from a base station to a remote station by the use of three layer L3 messages, which are referred to herein as the Walsh Table ID message, the Walsh Mask message, and the Last Walsh Code indicator message. The Walsh Table ID message is used to identify one of a plurality of Walsh tables, wherein each table lists indices of Walsh codes that are available for establishing a packet data channel between the base station and the remote station. The indices can further be stored as a function of a particular order of use, i.e., the order of the indices indicates that a particular Walsh code sequence is to be used before other Walsh code sequences.

The Walsh Mask message is carried on the Forward Packet Data Control Channel (F-PDCCH) along with a MAC identifier (MAC_ID) to indicate the bitmap of the availabilities of the Walsh codes listed in the specified Walsh Table. Certain predetermined MAC_IDS may be common to a group of remote stations or MAC_IDS may be unique to an individual remote station. Unique MAC_IDs can be assigned to remote stations in accordance with a unique International Mobile Station Identify (IMSI) when the remote stations enter the communication system. In one implementation, the MAC_ID value is "0x 00," which is a MAC_ID reserved for broadcasts to all remote stations within the serving range of the base station. The Walsh Mask message is used to signal possible "holes" in the Walsh table selected by the Walsh Table ID message. The holes are created when certain Walsh codes are allocated to other traffic channels, such as the Forward Supplemental Channel (F-SCH), the Forward Fundamental Channel (F-FCH), and/or the Forward Dedicated Control Channel (F-DCCH).

The Last Walsh Code Indicator (LWCI) message is carried on the F-PDCCH with the user MAC_ID to indicate the index of the last Walsh codes that were used for the corresponding F-PDCH. The LWCI message can be thought to carry information as to which Walsh code was used to set up the last previous Forward Packet Data Channel.

Figure 3:
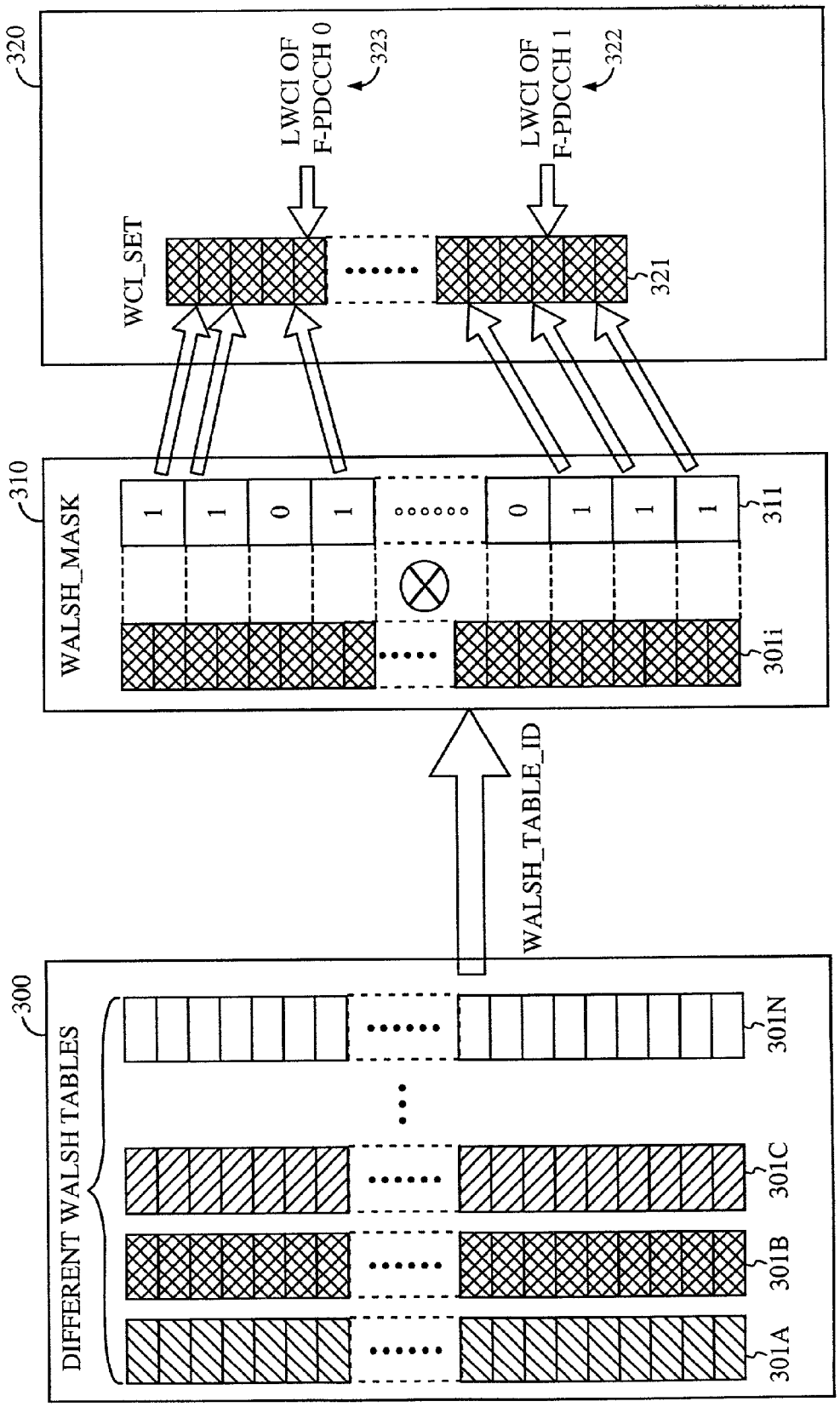
FIG. 3 is a diagram of the process of obtaining Walsh Space Information.

FIG. 3 illustrates the methodology of obtaining Walsh space information for a F-PDCH. Section 300 illustrates the various Walsh tables 301A, 301B, . . . 301N stored both at the base station and the remote station. A Walsh Table ID message, a Walsh Mask message, and a Last Walsh Code Indicator message are transmitted by the base station to the remote station. Section 310 illustrates the overlay of the mask 311 defined by the Walsh Mask message with the table 301i identified by the Walsh Table ID message. In FIG. 3, the mask 311 is represented by a sequence of "0"s and "1"s, which are then multiplied to the table 301i, wherein multiplication with the "0"s means that the corresponding sequence in the table 301i is not available for use. The overlay of the mask 311 produces a set 321 of Walsh codes in Section 320 that will be used for dedicated communications between the base station and the remote station. Section 320 further illustrates the index of the last Walsh codes used for the corresponding F-PDCH using LWCI information 322, 323.

The methodology described above is flawed due to the manner in which the Walsh Mask message is transmitted to a remote station. The Walsh Mask message is transmitted on the F-PDCCH in a broadcast manner. Therefore, the flaws that are common and inevitable to all broadcast transmissions affect the performance of the above methodology. In particular, there are two issues: reliability and efficiency.

As to reliability, transmitting the Walsh Mask message in a broadcast manner does not guarantee that every remote station can receive the information, even with re-transmissions. When a remote station has difficulty acquiring the correct Walsh Mask information, there is no systematic way to recover from the lack of the needed Walsh Mask information.

The lack of reliability leads to a lack of efficiency. Since the base station may be unable to determine that a remote station does not have the correct Walsh Mask information, system efficiency would suffer. If a remote station does not have the correct Walsh Mask information, then any transmissions to said remote station would be wasted.

Acknowledgments to Broadcast Messages

In one embodiment, an acknowledgement is generated and used in response to a broadcast of the Walsh Mask message. As indicated above, "broadcast" is a term of art indicating the transmission of a message under specific conditions, namely, the attachment of a common MAC_ID rather than a particular user MAC_ID to transmissions on a broadcast channel so that every remote station sharing the common MAC_ID can demodulate and decode the broadcast transmission. The embodiment makes use of an acknowledgement channel that is designed for acknowledging the success or failure of a transmission on a dedicated channel. As discussed above, the intended, original use of the acknowledgment channel is for allowing a scheduling element in a base station to increase the data throughput rate of the system.

Figure 4:
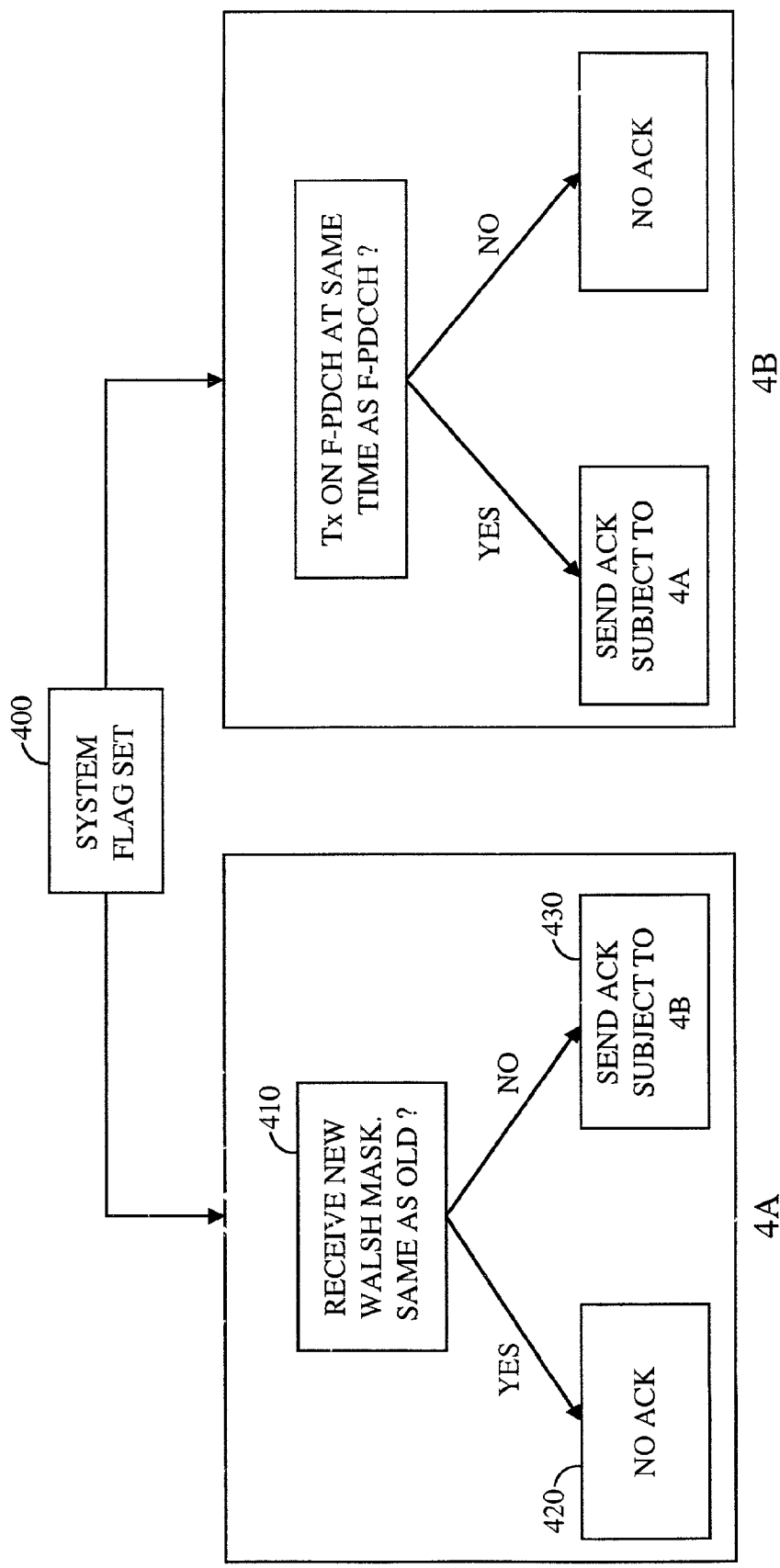
FIG. 4 is a flowchart illustrating when a remote station should transmit acknowledgments to a broadcast message.

FIG. 4 describes the generation of an acknowledgment to a broadcast transmission using a new Acknowledgment Channel, which is described in more detail below for FIG. 5B. A processor and memory element is configured in a base station to perform the method steps described in FIG. 4. Alternatively, other infrastructure elements can be configured to perform the steps. The embodiment comprises the implementation of both program flows described by blocks 4A and 4B. At step 400, a system flag is set in a remote station as to whether acknowledgments to a broadcast transmission must be generated. In this embodiment, the broadcast transmission is a Walsh Mask message.

At step 410 of block 4A, the remote station receives a Walsh Mask message and compares the newly received Walsh Mask to an old Walsh Mask stored at the remote station. If the received Walsh Mask message is the same as the old Walsh Mask message, then at step 420, the remote station refrains from transmitting the acknowledgment. In one embodiment, if the remote station has previously acknowledged the old Walsh Mask message, then remote station can be configured to repeat the acknowledgement. If the received Walsh Mask message is different from the old Walsh Mask message and the conditions described in block 4B are met, then at step 430, the remote station transmits an acknowledgment on the reverse link acknowledgement channel described in FIG. 5B.

At step 450 of block 4B, the remote station determines whether a transmission on the F-PDCH was scheduled at the same duration as a Walsh Mask message on the F-PDCCH. If not, then at step 460, the remote station refrains from transmitting the acknowledgment. If so and the conditions of block 4A are met, then at step 470, the remote station transmits an acknowledgment on the reverse link acknowledgement channel described in FIG. 5B.

Figure 5A:
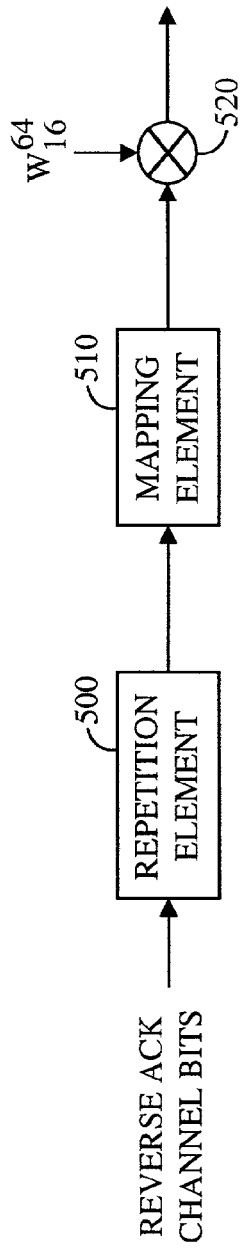
FIG. 5A is a block diagram of a prior art channel structure for an acknowledgment channel.

FIG. 5A is an example of a prior art acknowledgment channel structure for acknowledging messages received on dedicated channels. A remote station (not shown) generates one bit, either 0 or 1, for each slot to indicate whether a subpacket has been accurately decoded or not. A "slot" is a duration of time and a "subpacket" is a transmission unit. A message can be transmitted as one or as a plurality of subpackets over at least one slot period. The bit is repeated a plurality of times in a repetition element 500. In a system that transmits at a rate of 1.2288 megachips per second (Mcps), an optimal repetition factor is twenty-four (24). The term "chip" is used to describe a bit in a spread sequence, such as a bit pattern spread by a Walsh code. The output of the repetition element 500 is mapped by a mapping element 510 to either +1 or −1. The output of the mapping element 510 is covered by a spreading element 520. In one embodiment, the spreading element 520 can be a multiplier that spreads the mapping output by an $i^{th}$ 64-ary Walsh code sequence.

Figure 5B:
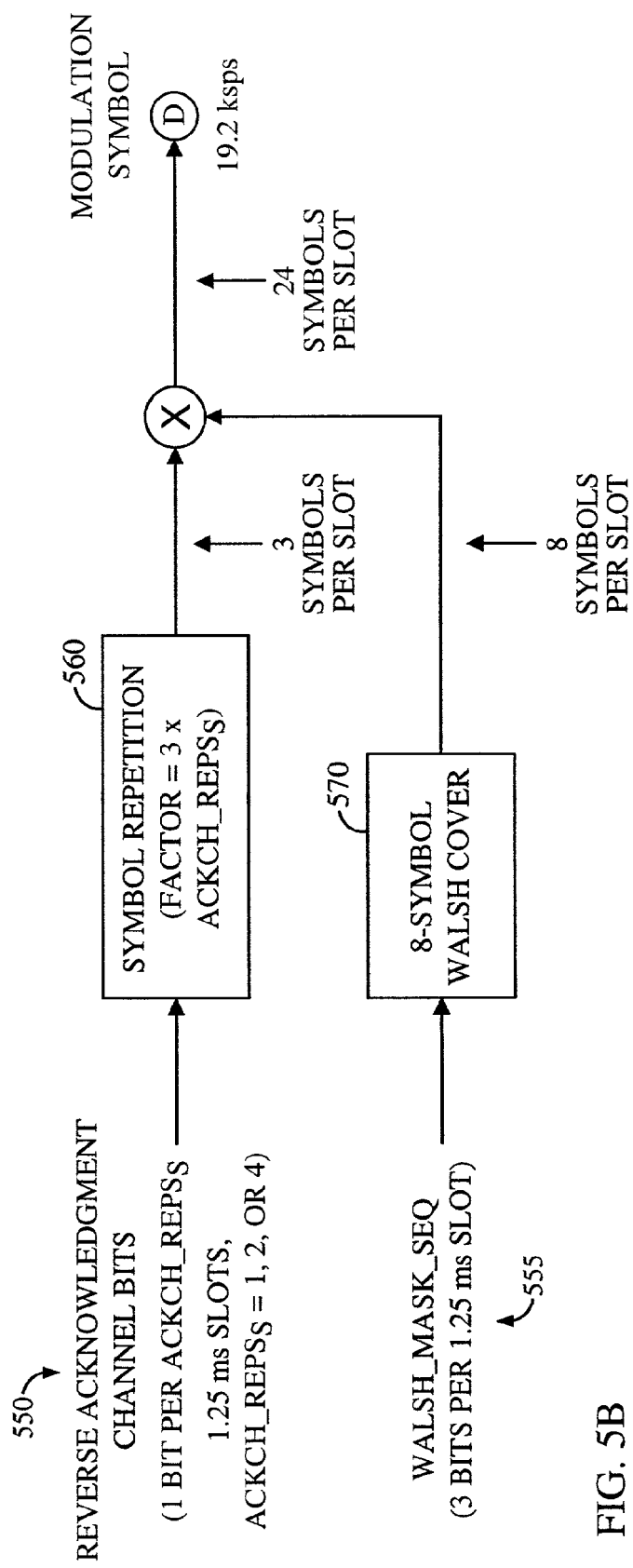
FIG. 5B is a block diagram of a new channel structure for an acknowledgment channel.

FIG. 5B is a block diagram of a channel structure for a new Reverse Link Acknowledgement Channel (R-ACKCH) for acknowledging transmissions sent on a dedicated packet channel, and for acknowledging transmissions sent on a broadcast channel. Reverse Acknowledgment Channel bits 550 for the dedicated channels are input into repetition element 560 at repetition factor RF=3×ACKCH_REPS$_s$, wherein ACKCH_REPS$_s$ is a system defined constant of 1, 2, or 4. In one embodiment, the number of Reverse Acknowledgment Channel Bits are generated according to the rule of 1 bit per ACKCH_REPS$_s$ over a 1.25 ms slot. The output of the repetition element 560 is 3 symbols per slot. Reverse Acknowledgment Channel bits 555 for transmissions received on the broadcast channels are input into covering element 570. The Reverse Acknowledgement Channel bits 555 are used by the covering element 570 to select a Walsh code sequence. The selected Walsh code sequence comprises 8 symbols per slot, which covers the output of the repetition element 560 by the use of a multiplier 580 to form 24 symbols per slot. Using slots of duration 1.25 ms, the output of the multiplier is generated at a rate of 19 kilo-symbols per second (ksps). The output is then sent to be modulated, upconverted and transmitted over-the-air, the details of which are not discussed herein.

In one general embodiment, the new R-ACKCH channel can acknowledge any broadcast transmissions in addition to acknowledging dedicated transmissions. It should be noted that the value of the acknowledgment bit for the broadcast transmissions is used to select the Walsh code sequence that covers the acknowledgment bit for the dedicated transmissions. When the base station receives the acknowledgment message, the base station will be able to identify the Walsh code sequence used to cover the acknowledgment bit for the dedicated channel.

Exchange of Signaling Messages

Due to the fluctuations of the reverse link, acknowledgments sent on an acknowledgment channel as described above can be misread as negative acknowledgments. In another embodiment, a base station and a remote station can exchange related information via L3 signaling messages. Embodiments wherein L3 signaling messages are exchanged can be performed alongside the embodiments described above.

In order to exchange the L3 signaling messages, a methodology must be established for the remote station to be able to demodulate and decode the L3 signaling messages on a dedicated channel. The question is how a remote station can demodulate and decode a message sent with a particular transmission format when the remote station has no knowledge of the transmission format.

As described earlier, transmissions for a particular remote station are sent on a dedicated channel and transmissions for a group of remote stations are sent in a broadcast manner. The transmissions on the dedicated channel are encoded using a set of parameters that are picked from a large selection of potential parameters. If the remote station does not know the particular set of parameters that were used by a base station, then the remote station would have to attempt to demodulate and decode the transmission using every set of parameters, until the transmission is decoded correctly. This is an inefficient methodology. Hence, transmission format information is typically transmitted on a broadcast channel so that a remote station could receive the transmission format information.

Using this broadcasted transmission format information, the remote station would be able to demodulate and decode a transmission message on the dedicated channel quickly and efficiently. The embodiments described herein are for allowing a remote station to demodulate and decode transmission format information on a dedicated channel.

In one embodiment, at least one processor and memory element, or other infrastructure elements that can perform a scheduling function within a base station, are configured to transmit L3 signaling messages or other transmissions using an overlapping set of Walsh code sequences. An overlapping set of Walsh code sequences is a set of Walsh code sequences that are common between a previous Walsh space and a current Walsh space. If a new Walsh space is chosen to transmit information, then it is probable that a subset of the new Walsh set is the same as a subset of the old Walsh set. This common subset is referred to as the overlapping set.

As described in FIG. 3, the use of a Walsh mask upon a Walsh table produces a set of available Walsh code sequences. The LWCI message indicates which Walsh codes were last used. Generally, systems implement a selection rule for determining which Walsh codes are to be used next. For example, a general selection rule is to pick Walsh codes from the bottom of the table and move up the table for each subsequent transmission on a dedicated channel.

In one embodiment, the processor and memory element are configured to determine which Walsh codes were last used from a previously used table and which were not. Using knowledge of Walsh selection rules, the processor and memory element select a set of Walsh codes from the previous table, wherein the set of Walsh codes comprise the Walsh code sequences that were least likely to be selected by a given selection rule. The processor and memory element then select a new Walsh code table that shares these least-likely selected Walsh codes. Alternatively, the LWCI indicator is reset to point to these Walsh codes of the previous table. It should be noted that the order of the Walsh code sequences in the tables may be arbitrary as long as both the base station and the remote station agree upon or share the same order.

Using these overlapping Walsh code sequences, the base station transmits L3 signaling messages to a remote station on a dedicated channel, such as a F-PDCH, wherein the L3 signaling message contains the transmission format information for other transmissions. It should be noted that the quality of the forward and reverse links often fluctuate widely, so that the transmission formats of the transmission messages can also vary widely in order to optimize the data throughput of the system.

Once the base station determines the overlapping Walsh code sequences, the base station may transmit on a dedicated channel to a remote station that does not have the current transmission format information.

Figure 6:
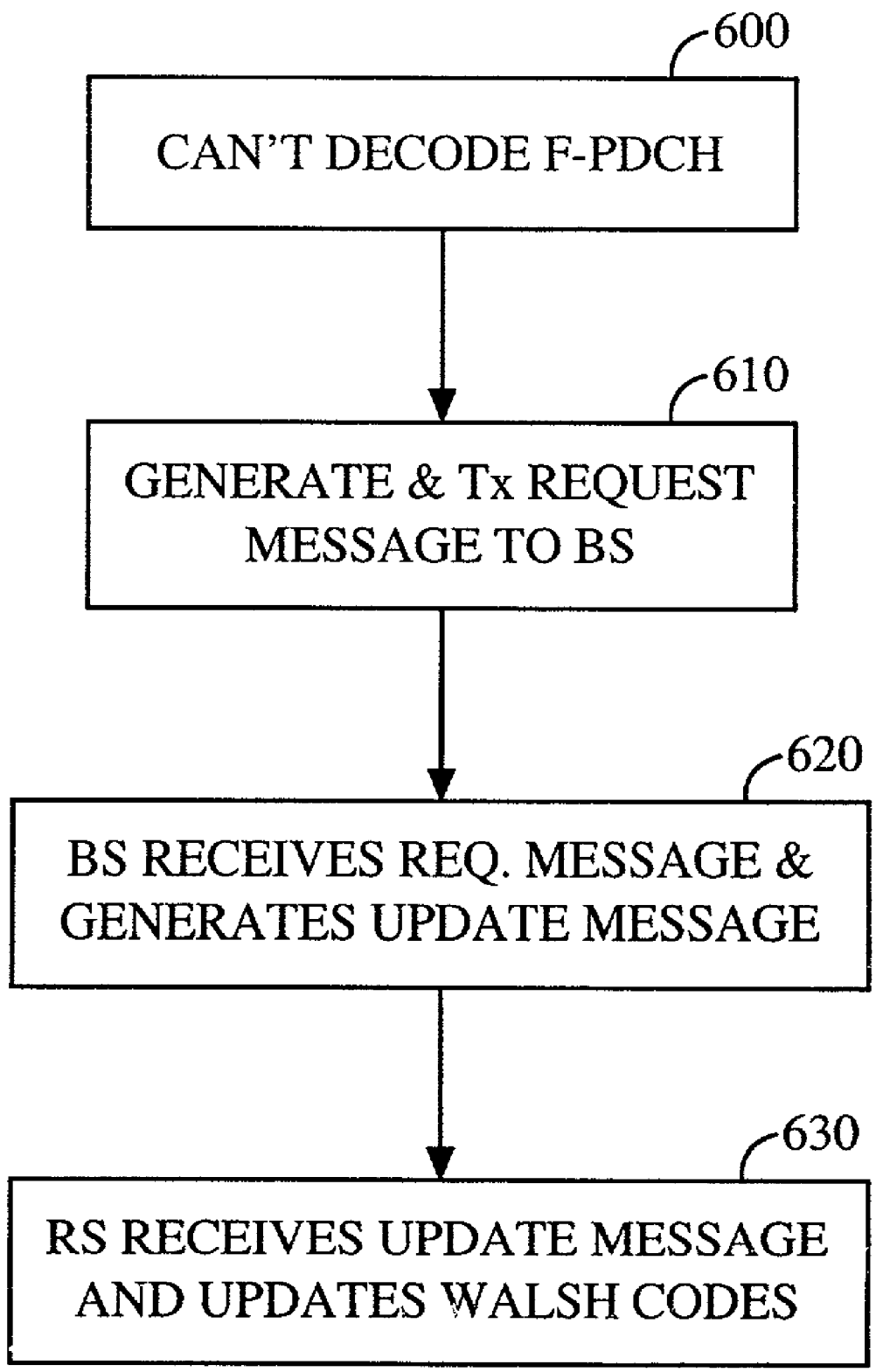
FIG. 6 is a flowchart illustrating how the Walsh code sequences of a remote station are updated.

FIG. 6 is a flowchart for exchanging L3 signaling messages that contain current transmission format information. At step 600, the remote station determines that a recently received transmission on a dedicated channel could not be properly decoded, indicating that a wrong Walsh mask, Walsh table, or LWCI was used. At step 610, the remote station generates a Walsh Mask Request Message or a Walsh Table ID Request Message or a LWCI Request Message, whichever is appropriate, and transmits said message to a serving base station. At step 620, the serving base station receives said message and sends a Walsh Mask Update Message or a Walsh Table ID Update Message or a LWCI Update Message to the remote station, whichever update response is an appropriate reply to said message. At step 630, the remote station receives said update response and updates the Walsh code sequences. Note that the update Walsh information update messages can be sent autonomously by the base station, i.e., without a corresponding request from the remote station.

The embodiments described above are for sending transmission format information on a dedicated channel rather than, or in addition to, a broadcast channel. These embodiments can be implemented whenever a remote station first enters the range of a serving base station. Additionally, the embodiments can be implemented whenever a remote station transmits a negative acknowledgment in response to a broadcast transmission, the process of which is described above.

Synchronization of Orthogonal Space Information

The embodiments for the reliable conveyance of orthogonal code space information that were described above depend upon the quality of the transmission channel, either a broadcast channel or a dedicated channel. If the situation arises when neither type of channel is adequate to update orthogonal space information, the following embodiments for synchronizing orthogonal space information can be implemented along with the embodiments described above. Typically, if the channel conditions were inadequate for conveying messages to a remote station for an extended period of time, then the remote station would transmit a series of negative acknowledgments to the transmitting base station. Rather than have the base station wait for a plurality of negative acknowledgments before forming a determination that the remote station has the wrong orthogonal space information, the embodiments described below allow a base station to make a determination after receiving just a single negative acknowledgment.

In one embodiment, a serving base station is configured with a plurality of counters, each associated with a remote station operating within the range of the serving base station. The number of counters can be a system defined parameter set by the number of remote stations that a base station can serve within a quality threshold. Each remote station would also be configured with a counter, which would be synchronized with the corresponding counter at the base station.

In one embodiment, the counters are 3-bit counters. The 3-bit counters would count the number of Walsh Mask changes. The counter at the base station would be incremented by one modulo eight when a new Walsh Mask message is transmitted to the remote station, and the counter at the remote station would be incremented by one modulo eight when a new Walsh Mask message is received.

A general description of this embodiment is that the content of the counter at the remote station would be used to select a Walsh cover, and the Walsh cover is used to cover the acknowledgment or negative acknowledgment bits sent on a new reverse acknowledgment channel (R-ACKCH), such as described in FIG. 5B. In the new reverse acknowledgment channel, the value of the acknowledgment bits for the broadcast transmissions is used to select the Walsh code sequence that covers the acknowledgment bit for the dedicated transmissions. If the length of the acknowledgment for broadcast transmissions is 3-bits long, then 8 values can be embedded into the transmitted acknowledgment message. When a base station receives an acknowledgment or negative acknowledgment bit from the remote station, the base station checks the Walsh cover of the received bit and extracts the embedded counter content. If the embedded counter content of the received acknowledgment or negative acknowledgment differs from the local counter value, the base station determines that a synchronization problem occurred, such that the remote station is not operating with the current transmission format information. Hence, in this embodiment, the counter values act as the sequence identifiers of the Walsh masks. Once a synchronization problem has been identified, the base station can then take appropriate actions to correct the problem.

In one embodiment, the base station corrects the synchronization problem by resetting the local counter to the embedded counter content, which is specified by the Walsh cover of the acknowledgment or negative acknowledgment bit from the remote station. In this embodiment, the base station must have at least one counter for each remote station, so that the base station can keep track of all embedded counter contents.

In another embodiment, the base station transmits an L3 signaling message, the process of which is described above in the text for FIG. 6. In addition to transmission format information, the L3 signaling message can be configured to further carry the content value of the appropriate base station counter. Upon receiving the L3 signaling message, the remote station resets its counter value to the appropriate counter value and resets the Walsh space information according to the L3 signaling message.

In another embodiment, the base station forces a reset of all remote station counters to a common counter value. On the broadcast channel, the base station could transmit a counter reset command message and attach a common MAC_ID rather than a particular user MAC_ID to the reset command. Hence, every remote station sharing the common MAC_ID would receive the counter value and reset the local counter appropriately.

Alternatively, the actual common MAC_ID itself could be used as the counter reset value. For example, in a cdma2000 system, the MAC_ID values 0–7 are designated as common amongst all remote stations operating within the range of a serving base station. Hence, if MAC_ID value 6 is transmitted on the broadcast channel, all the remote stations would be configured to decode the message attached to this MAC_ID. In one embodiment, if a 3-bit counter is used at both the base station and the remote station, then $2^3=8$ values need to be conveyed to the remote stations. If the value of the local counter is used to pick the value of the MAC_ID, then the need for a separate reset command message is eliminated. The MAC_ID would serve a dual purpose; first, the original purpose of specifying that an attached message is for all remote stations, and second, the purpose of identifying a counter value.

It should be noted that if the base station forces a common value reset, the base station need have only one local counter since all the remote stations would be reset to have the same counter contents.

It should further be noted that counters with larger or smaller sizes, such as 2-bit counters or 4-bit counters, can be used without unduly affecting the scope of the embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for sending a message on a dedicated channel to a remote station, comprising:
    a memory element; and
    a processing element configured to execute a set of instructions stored on the memory element, the set of instructions for:
        determining an overlapping set of Walsh code sequences from comparing the new Walsh space and the previous Walsh space; and
        sending the message on the dedicated channel using the overlapping set of Walsh code sequences.

2. A method of formatting a message to be sent on a dedicated channel to a remote station, comprising:
    determining an overlapping set of Walsh code sequences from comparing the new Walsh space and the previous Walsh space; and
    sending the message on the dedicated channel using the overlapping set of Walsh code sequences.

3. A method for ensuring that a remote station receives the transmission format information associated with a transmission on a dedicated channel, comprising:
    sending a broadcast message containing the transmission format information to the remote station;
    if a negative acknowledgment is received from the remote station, then:
        formatting the broadcast message using an overlapping set of Walsh code sequences; and
        transmitting the re-formatted broadcast message on the dedicated channel to the remote station.

4. An apparatus for ensuring that a remote station receives the transmission format information associated with a transmission on a dedicated channel, comprising:
    a memory element; and
    a processing element configured to execute a set of instructions stored on the memory element, the set of instructions for:
        sending a broadcast message containing the transmission format information to the remote station;
        if a negative acknowledgment is received from the remote station, then:
            formatting the broadcast message using an overlapping set of Walsh code sequences; and
            transmitting the re-formatted broadcast message on the dedicated channel to the remote station.

5. An apparatus for sending a message on a dedicated channel to a remote station, comprising:
    means for determining an overlapping set of Walsh code sequences from comparing the new Walsh space and the previous Walsh space;
    means for sending the message on the dedicated channel using the overlapping set of Walsh code sequences; and
    means for selecting the second communication data rate based at least in part upon the plurality of communication data rate requests obtained from each of the plurality of terminals.

* * * * *